March 15, 1927.  
S. B. HASELTINE  
1,620,651  
FRICTION SHOCK ABSORBING MECHANISM  
Filed Jan. 7, 1924  
2 Sheets-Sheet 2
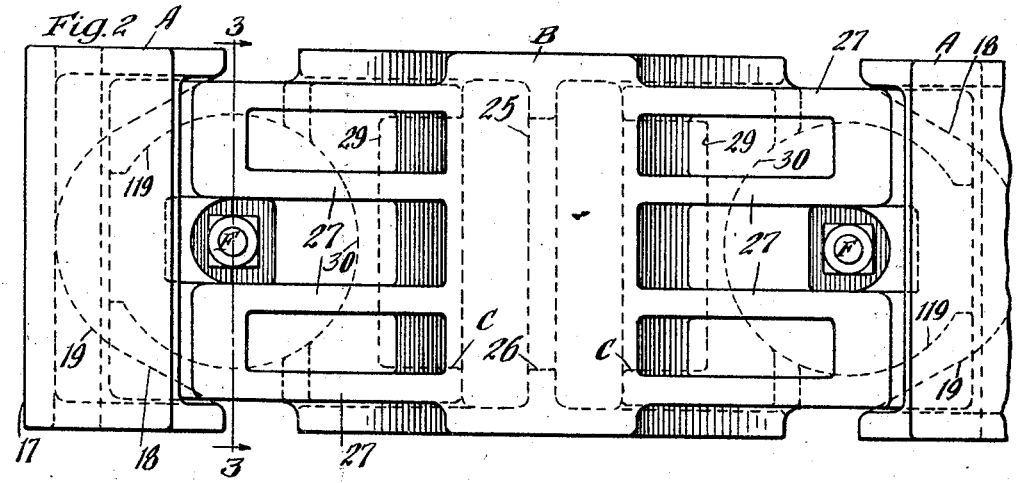
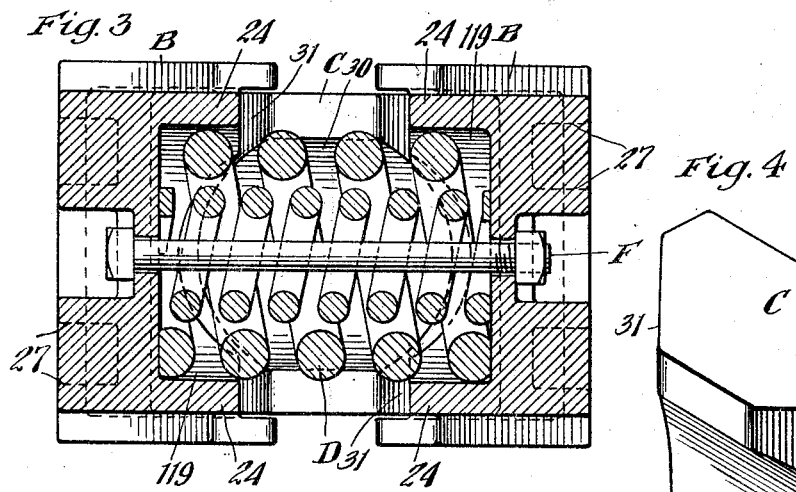
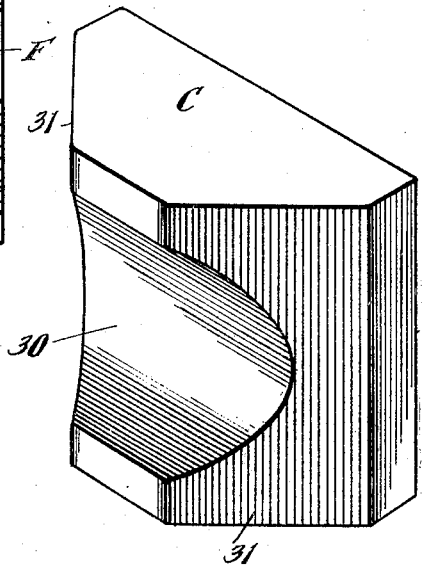
Witnesses  
Wm. Giger
Inventor  
Stacy B. Haseltine  
By George J. Haight  
Atty.

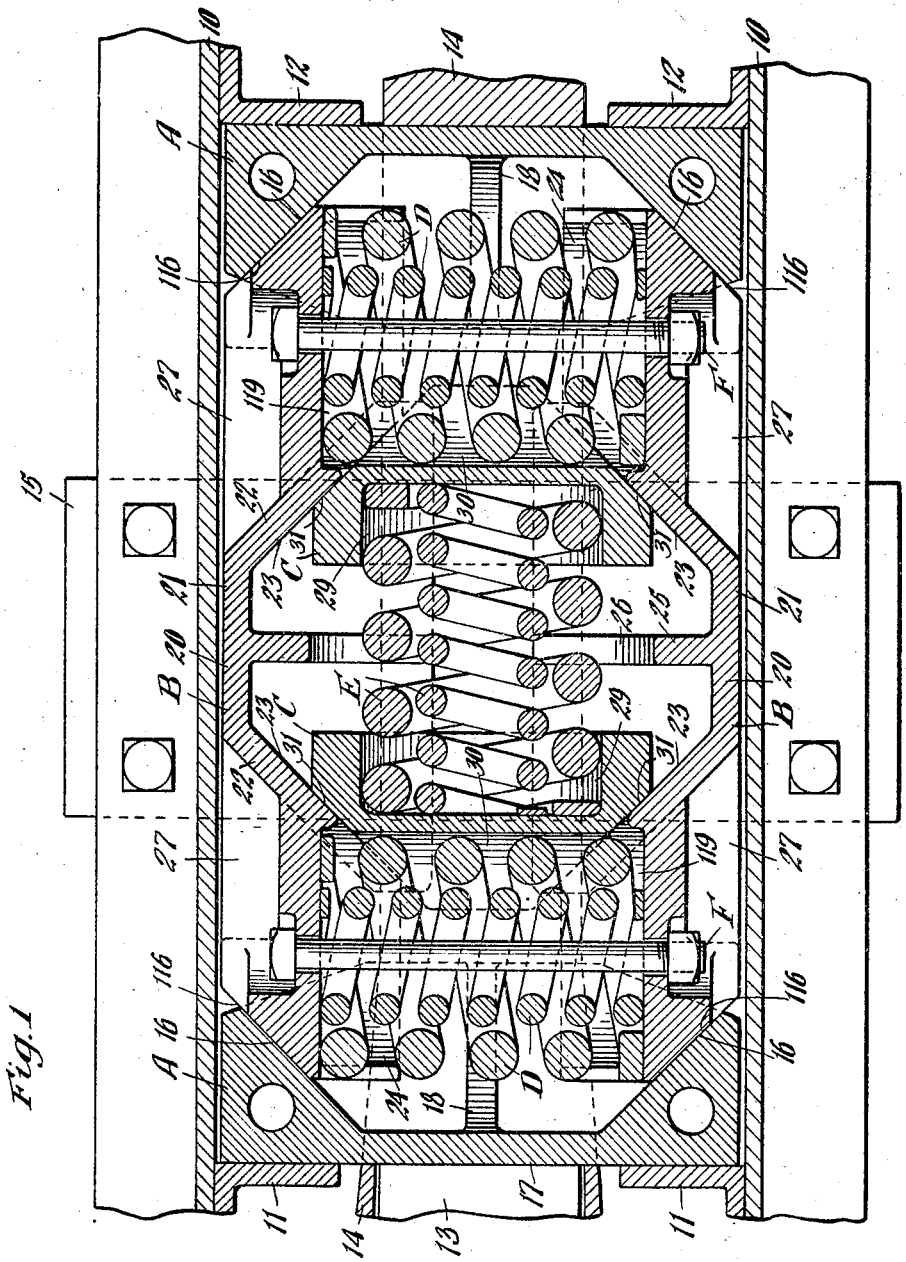

Patented Mar. 15, 1927.

1,620,651

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 7, 1924. Serial No. 684,692.

This invention relates to improvements in friction shock absorbing mechanisms.

One object of this invention is to provide a friction shock absorbing mechanism especially adapted for railway draft riggings, wherein is obtained high capacity together with certain release.

Another object of the invention is to provide a friction shock absorbing mechanism of unusually compact form and employing triple springs with spring follower-acting members associated with each spring, the spring follower acting members co-operating frictionally to thereby produce very high capacity.

In the drawings, forming a part of this specification, Figure 1 is a horizontal, longitudinal, sectional view of a draft rigging, showing my improvements in connection therewith. Figure 2 is a side elevational view of the mechanism shown in Figure 1, the same being partly broken away to better accommodate the view to the sheet. Figure 3 is a vertical, transverse, sectional view corresponding substantially to the line 3—3 of Figure 2. And Figure 4 is a detailed, perspective view of a spring cap used in connection with my improved mechanism.

In said drawing, 10—10 denote channel draft sills of a car underframe, to the inner faces of which are secured front stop lugs 11—11 and rear stop lugs 12—12. A portion of the drawbar is indicated at 13 to which is secured a hooked yoke 14 of well known form. The shock absorbing mechanism proper, hereinafter described, is disposed within the yoke in the usual manner. All the movable parts of the draft rigging are supported by means of a detachable saddle plate 15.

The improved shock absorbing mechanism proper, as shown, comprises broadly, front and rear followers A—A; a pair of side plates B—B; a pair of spring caps C—C; a pair of transversely disposed spring resistance elements D—D; a longitudinally disposed spring resistance element E; and a pair of retainer bolts F—F.

The front and rear followers A—A are of like construction, each being in the form of a generally rectangular, hollow casting, having a pair of interior wedge faces 16—16 on opposite sides thereof, diverging inwardly of, or toward the center of the mechanism. Each of the followers is provided with a flat end face 17 adapted to co-act with the corresponding stop lugs. Each follower is also provided with longitudinally disposed, upper and lower, interior strengthening ribs 18—18 cut away as indicated at 19 to clear the corresponding, transversely disposed spring resistance element D, when the mechanism is fully compressed.

The plates B, which are of like construction, are arranged at opposite sides of the mechanism. Each plate B is provided with outer, front and rear wedge faces 116—116 correspondingly inclined to and adapted to co-act respectively with the corresponding faces 16 of the front and rear followers A. The inner side of each plate B is recessed at opposite ends as indicated at 119, providing a pair of lateral inwardly opening pockets, the pockets at the corresponding ends of the plates being disposed in alinement and receiving the opposite ends of the corresponding transversely disposed spring resistance element D. The central portion of each plate is outwardly offset as indicated at 20. The offset portion of each plate comprises a vertically disposed, flat outer wall 21 and vertically disposed side walls 22—22, diverging inwardly, or toward the axis of the mechanism. The plate B is cut away on planes coincident with the inner surfaces of the respective walls 20—20, the faces of said cut away portions forming continuations of the inner surface of the respective side walls, thereby providing a pair of interior front and rear wedge faces 23—23 diverging toward the axis of the mechanism. The upper and lower edges of each plate between the pockets 119 are provided with horizontally disposed, inwardly extending flanges 24—24 forming the upper and lower walls respectively of the offset portion 20. The offset portion 20 of each plate is reinforced by a vertically disposed, interior rib 25, cut away as indicated at 26 to clear the central, longitudinally disposed spring resistance E when the mechanism is compressed. The plates B are each also provided with a plurality of longitudinally disposed outer strengthening ribs 27—27 extending from the opposite ends of the plate to the offset portion thereof.

The spring caps C—C, which are of like construction, are in the form of rectangular blocks, each having a cylindrical recess 29 at the inner end, adapted to receive the corresponding end of the spring resistance E. At the outer side each of the spring caps C is provided with a transversely disposed concavity 30 adapted to accommodate the side of the corresponding spring resistance D when the parts are in normal position. At its outer end, each spring cap C also has a pair of outwardly converging, side wedge friction faces 31—31. One of the spring caps C has the wedge faces 31 thereof coacting respectively with the front wedge faces 23 of the offset portions of the two plates B, and the other cap has the wedge faces thereof co-acting with the rear wedge faces 23—23 of said offset portions.

The two spring resistance elements D, which are disposed transversely of the mechanism, are interposed between the plates B at the opposite ends thereof, and are seated in the pockets 119. Each of the elements D comprises a relatively heavy, outer coil and a relatively light inner coil. The longitudinally disposed, central spring resistance E, which comprises an inner and outer coil, is interposed between the spring caps C and has its opposite ends seated in the recesses 29 thereof.

The retainer bolts F are disposed at opposite ends of the mechanism and extend transversely of the plates B, axially of the respective spring resistance elements D, and have their opposite ends anchored in the respective plates. The bolts F not only serve to hold the parts in assembled relation but also maintain the mechanism under initial compression.

The operation of the mechanism, during a compression stroke, and assuming a buffing action, is as follows: As the front follower A is moved rearwardly toward the rear follower A, the coacting wedge faces of the followers and plates B will force the latter inwardly toward the axis of the mechanism, thus compressing transversely arranged spring resistance elements D, and the relatively approaching plates, through the coacting wedge faces 23 and 31, will force the followers C relatively toward each other, thereby simultaneously compressing the longitudinal spring resistance E. The described action continues until the longitudinal edges of the flanges 24 of the plates B come into abutment and the inner faces of the front and rear followers A engage the opposite ends of the plates B, whereupon the forces will be transmitted directly through the plates B to the sills, the plates B acting in the manner of a solid column load-sustaining member. When the actuating pressure is removed, the parts will all be restored to normal position by the expansive action of the three springs, the releasing action being facilitated due to the relatively large included angle between the different opposed wedge faces. During draft, the action will be the reverse of that just described, the front follower A being held stationary and the rear follower being moved relatively thereto.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with front and rear followers each having wedge means thereon; of a pair of side members having friction faces coacting with the wedge faces of said followers; cushioning means directly engaging said members, said cushioning means being interposed therebetween; additional cushioning means interposed between said members; and follower means co-acting with said last named cushioning means, said follower means and side members having co-acting friction wedge faces thereon.

2. In a friction shock absorbing mechanism, the combination with relatively movable end followers having wedge means thereon; of a pair of longitudinally disposed side members having a plurality of wedge faces thereon, certain of which coact with said followers; a pair of transversely disposed spring caps interposed between said members and having wedge faces coacting with the remaining wedge faces of said members; spring resistance elements coacting with said members; and additional spring means resisting relative approach of said caps.

3. In a friction shock absorbing mechanism, the combination with front and rear followers having wedge faces thereon; of a pair of relatively movable side members each having outer and inner wedge faces, said outer faces coacting with said followers; a plurality of transversely disposed spring elements interposed between said side members; a longitudinally disposed spring resistance element; and spring followers coacting with said last named element, said spring followers having wedge faces engaging the intermediate wedge faces of the respective side members.

4. In a friction shock absorbing mechanism, the combination with a pair of end followers; of a plurality of springs compressible in a direction transverse to the axis of the mechanism and arranged near the ends of the mechanism; a centrally disposed spring compressible in a direction parallel to the axis of the mechanism; and friction-generating, spring follower members associated with each spring, said friction generating follower members co-operating with each other, and said end followers having wedging engagement with certain of said friction generating follower members.

5. In a friction shock absorbing mechanism, the combination with a pair of end followers; of a plurality of springs compressible in a direction transverse to the axis of the mechanism and arranged near the ends of the mechanism; a centrally disposed spring compressible in a direction parallel to the axis of the mechanism; and friction generating, spring follower members associated with each spring, said friction follower-acting members cooperating with each other, said end followers also frictionally cooperating with those follower-acting members directly associated with the first mentioned springs.

In witness that I claim the foregoing I have hereunto subscribed my name this 2nd day of January 1924.

STACY B. HASELTINE.